June 26, 1951 D. H. ANNIN 2,558,506
FLUID FLOW CONTROL APPARATUS
Filed Jan. 28, 1949 2 Sheets-Sheet 1
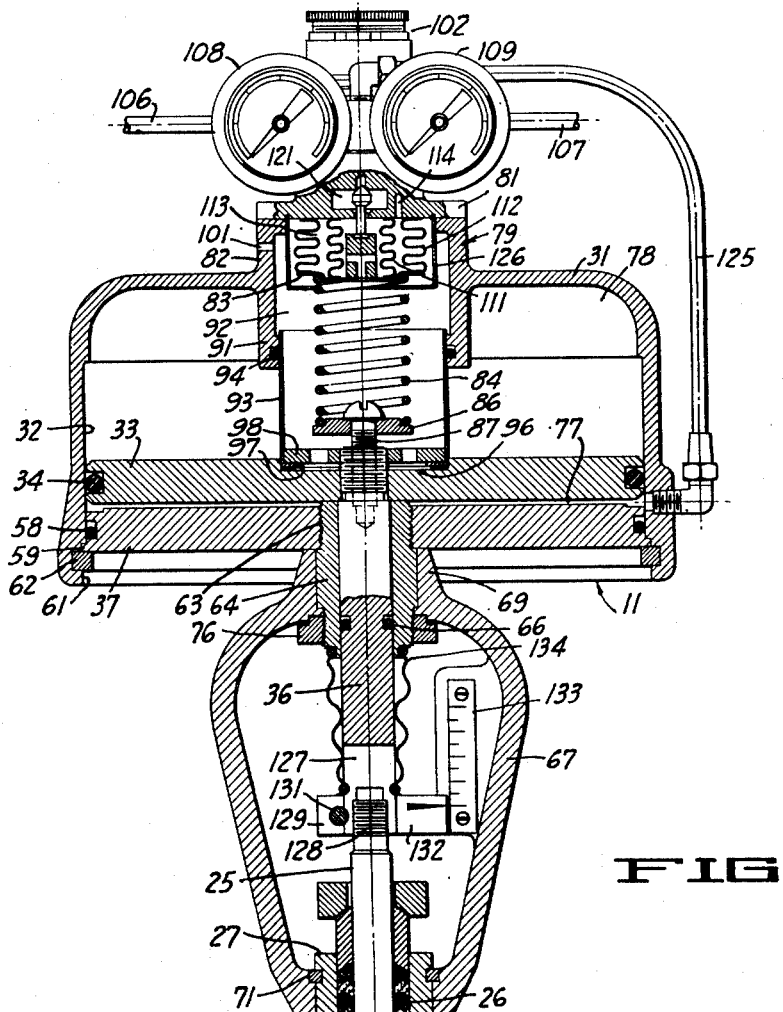
FIG_1_
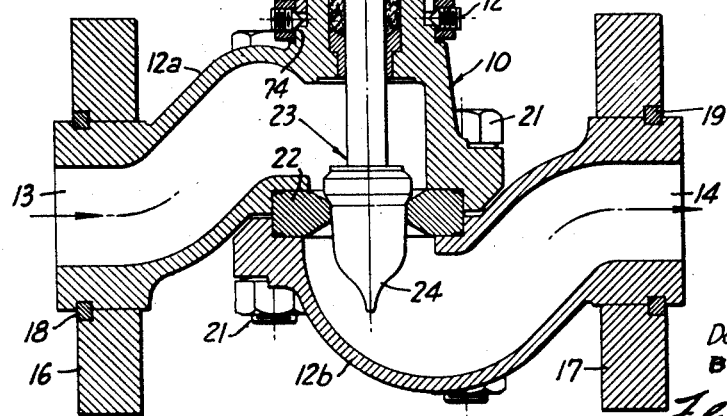
INVENTOR
Douglas H. Annin
BY
Flehr & Swain June 26, 1951  D. H. ANNIN  2,558,506
FLUID FLOW CONTROL APPARATUS
Filed Jan. 28, 1949  2 Sheets-Sheet 2
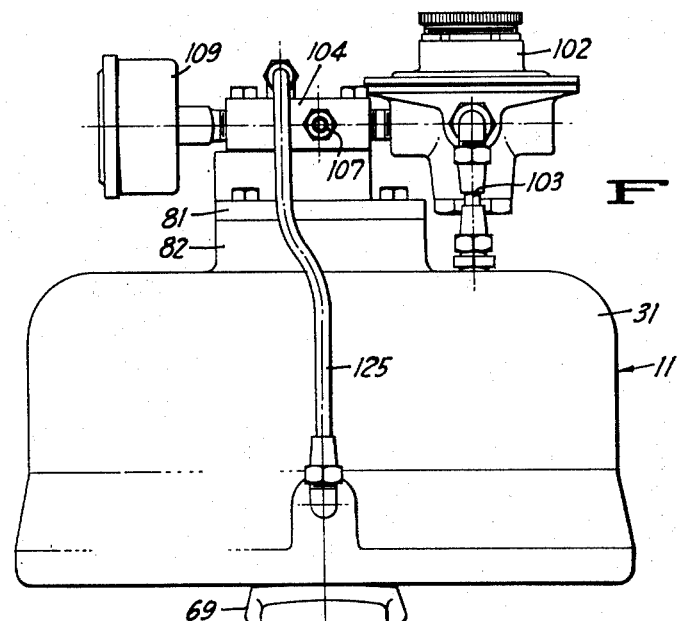
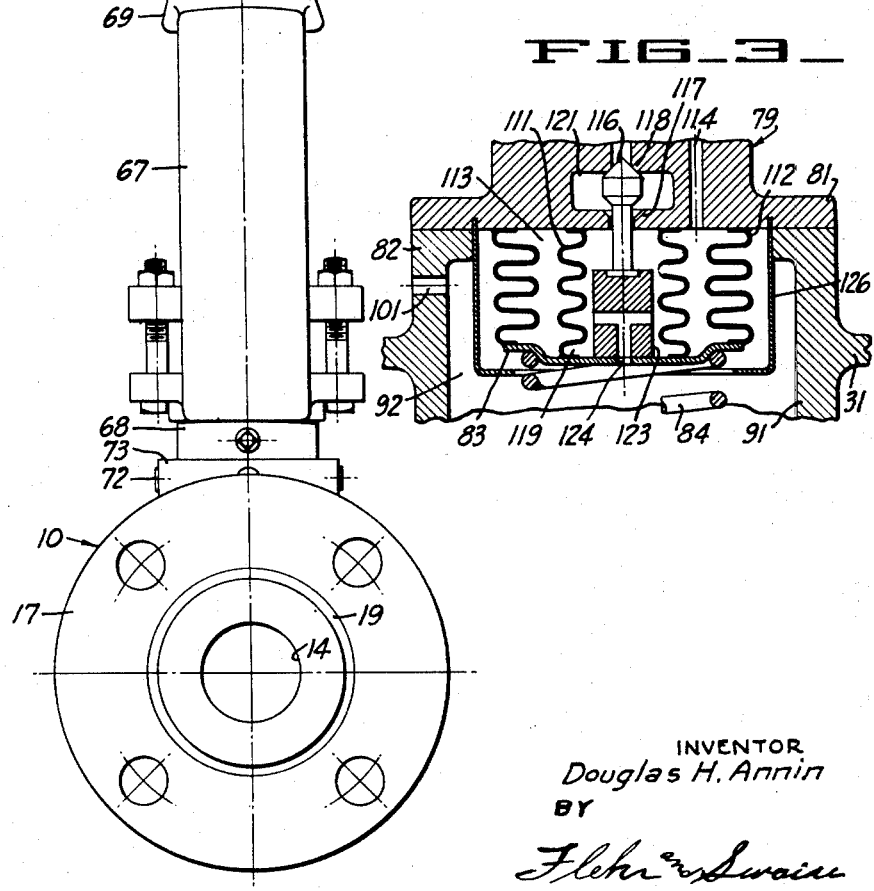
INVENTOR
Douglas H. Annin
BY Patented June 26, 1951

2,558,506

UNITED STATES PATENT OFFICE 2,558,506

FLUID FLOW CONTROL APPARATUS

Douglas H. Annin, Glendale, Calif., assignor to Grove Regulator Company, Oakland, Calif., a corporation of California Application January 28, 1949, Serial No. 73,401

4 Claims. (Cl. 121—41)

1

This invention relates generally to fluid flow control apparatus of the motor valve type, such as is provided with a fluid pressure operated member for operating a valve member and with a pneumatic valve positioner.

In the past various types of motor valves have been employed for the remote control of fluid flow. For example it has been common to attach a fluid pressure operated diaphragm to the stem of a globe valve, together with a loading spring serving to urge the valve member toward closed position. Fluid pressure is applied to one side of the diaphragm to move the valve member between open and closed positions. Where it is desired to secure relatively accurate positioning of the valve member between open and closed positions, pneumatic valve positioners are employed, such as disclosed for example in Moore 2,382,941. Such valve positioners have a mechanical connection to a moving part of the motor valve, and they serve to insure positioning of the valve stem in accordance with the value of a controlling pressure applied to the valve positioner.

In general it is an object of the present invention to provide an improved motor valve assembly of the above character, and which will be characterized by its simplicity, and ease of installation and maintenance for various services. A further object of the invention is to provide a novel arrangement and combination of parts for mounting the valve positioner and for operatively connecting the same to the piston or like operating member, and which is combined in a novel manner with a dome which provides gas pressure loading in place of a loading spring.

The present invention makes use of air pressure in a dome for applying loading forces to the valve stem, and also means including a compression spring for forming a direct connection between the valve stem and a valve positioner of the null type. A valve positioner is mounted upon the dome and the spring which connects the stem with the valve positioner is disposed within the loading chamber. Supplemental means is employed whereby the valve positioner is isolated from the loading pressure, and is exposed to atmospheric pressure. In addition the present invention incorporates other novel features of construction, including the assembly of parts forming the loading dome, and an arrangement for adjustably connecting the stem of the valve to the fluid pressure operated member.

Referring to the drawing:

Figure 1 is a side elevational view in section showing one form of the invention.

2

Figure 2 is a side elevational view looking toward the right hand side of Figure 1.

Figure 3 is a cross-sectional enlarged detail of a portion of the device shown in Figure 1.

The motor valve illustrated in the drawing consists generally of a valve 10 of the globe type, together with a pneumatic operator designated generally at 11. The particular globe valve illustrated is constructed as disclosed and claimed in copending applications Serial No. 776,757, filed September 29, 1947, and Serial No. 783,723, filed November 3, 1947. However other types of flow valves, having suitable flow characteristics, can be used instead of the special assembly illustrated.

Briefly the globe valve illustrated consists of two body parts 12a and 12b, which are formed of suitable metal, and which provide the inflow and outflow passages 13 and 14. Instead of using integral coupling flanges, flange rings 16 and 17 are provided, and which are machined to fit over the end portions of the body parts 12a and 12b. When assembled the flange rings 16 and 17 are held in place by the split or segmented lock rings 18 and 19.

The two body parts 12a and 12b are joined on a plane which is coincident with the axes of the passages 13 and 14. They are held in assembled relation by the clamping bolts or cap screws 21. A suitable reversible seat ring 22 is positioned between the body parts, and is adapted to cooperate with the movable valve member 23. This valve member is provided with a characterized plug extension 24.

The valve stem 25 extends to the exterior of the valve body through the packing gland 26. This gland is located within a sleeve-like extension 27 of the body part 12a.

The pneumatic motor operator 11 consists of a dome-like member 31, the interior of which is formed to provide the cylindrical bore 32. A piston 33 is fitted in the cylinder bore 32, and is sealed by the resilient rubber O ring 34. The center of piston 33 is attached to the rod 36, which is in alignment with the valve stem 25.

The lower side of the dome 31 is closed by an annularly contoured closure plate 37, which is sealed with respect to the cylindrical bore 32 by the resilient O ring 58. The plate 37 is also provided with a peripheral rib or flange 59, which is seated within the enlarged bore 61, and which is engaged by the adjacent face of a snap-in retainer ring 62.

The central portion of plate 37 is attached, a by means of threaded connection 63, to one end of the sleeve 64. This sleeve forms a guide for the piston rod 36, and is sealed with respect to the piston rod by suitable means such as the resilient O ring 66.

A suitable yoke 67 serves to mount the sleeve 64 in fixed relation with respect to the valve body. Thus the lower end of the yoke 67 has a hub 68 which embraces the body sleeve 27, and the upper end of the yoke has a hub 69 which embraces the sleeve 64. One end of the hub 68 is engaged by a split or segmented retainer ring 71, and the other end is engaged by the conical end faces of the set screws 72, which in turn are threaded at circumferentially spaced points in the ring 73. The inner conical end faces of the set screws 72 also engage the annular shoulder 74 on the valve body part 12a, so that when the screws 72 are turned to force the same inwardly, their inner ends cam against the shoulder 74 and the adjacent end face of the sleeve 68, to force this sleeve upwardly into clamping engagement with the retainer ring 71. The upper yoke hub 69 is clamped between the lower face of the plate 37, and a nut 76 which is threaded upon the lower portion of the sleeve 64.

It will be evident from the above that when air under pressure is applied to the space 77 between the piston 33 and the lower closure plate 37, the piston is urged to move upwardly and thus move the valve member 23 toward open position. As will be presently explained in greater detail the space 78 above the piston 33 is adapted to contain air under substantially constant pressure to form a loading force tending to urge the piston downwardly. Thus in order to move the piston 33 to different operating positions, varying pressures must be applied to the space 77, to move the piston 33 against the constant loading force of air pressure in space 78.

Mounted upon the top wall of the dome 31 there is a valve positioner device 79, the details of which will be presently described in detail. It is convenient to have this positioner device carried upon the inner side of the mounting plate 81, which in turn is secured to a raised annular wall 82 formed on the top of the dome 31. An operating part 83 of the valve positioner, in the form of a thrust plate, forms the seat for one end of the compression spring 84. This spring has an adjustable connection to the rod 36, and forms a part of the means which mechanically connects the valve positioner to the valve stem. Thus the lower end of this spring 84 is seated upon the disc 86, which in turn is mounted upon the upper end of a threaded screw 87. This screw is threaded into the upper end of rod 36, whereby when the disc 86 together with the screw 87 are turned, the position of the disc relative to the rod 36 is adjusted, to correspondingly adjust the tension upon the spring 84. Such adjustments can be made when the valve positioner together with its mounting plate 81, is removed from the assembly.

In addition to the parts described above, means is provided for isolating the valve positioner from the loading pressure in the space 78, and to insure application of atmospheric pressure to the valve positioner at all times. Thus the exterior wall portion 82, in conjunction with a depending interior wall portion 91, are arranged to form an inner cylinder bore 92, into which the cylindrical cup 93 is fitted. The cup is sealed with respect to the wall portion 91 by suitable means such as the resilient O ring 94, and it is suitably attached and sealed with respect to the piston 33. Thus the lower end portion of the cup 93 is seated within an annular recess 96 formed in the piston 33, and is provided with an inturned lip or flange 97, which is engaged by the clamping disc 98. This disc in turn has a threaded engagement with the upper end portion of the rod 36. A suitable gasket or like sealing means can be provided between the lower end of the cup 93 and the piston 33, to insure a fluid tight engagement. The bore 92 is preferably vented to the atmosphere as by means of port 101.

When utilizing apparatus as described above a suitable source of air under pressure is employed, which is generally of a pressure value higher than that required for application to the loading chamber 78. Therefore a suitable pressure reducing regulator 102 is illustrated, which has its inlet connected to the source of air supply, and which has its outlet connected by pipe 103, with the space 78. For convenience a ported block 104 is shown mounted upon the top of the valve positioner mounting 81, and an air supply pipe 106 is connected to this block, for effecting communication by way of ports in the block, with the inlet of the pressure reducing regulator 102. Another pipe 107 is likewise shown connected to block 104, and by means of a port in the block this pipe is connected to the valve positioner 79. Gauges 108 and 109 can be mounted upon the block 104 in order to indicate respectively the pressure in the pipes 106 and 107. The pressure applied to pipe 107 is a controlling pressure, and may be from a controlling instrument, such as a thermostat or the like.

The valve positioner 79 consists in this instance of the inner and outer metal bellows or Sylphons 111 and 112. Corresponding ends of these Sylphons are attached to the thrust plate 83, and also to the mounting plate 81. The chamber 113 between the two bellows is in communication by port 114 with pipe 107, or in other words to the instrument pressure. A double ended valve member 116 is adapted to move longitudinally to seat upon either one of the two opposed stationary seats 117 or 118. The orifice controlled by seat 117 communicates between the chamber 119, within the inner bellows 111, and the space 121, between the two seats 117, 118. The orifice controlled by seat 118 communicates with the air supply pipe 106. A device 123 serves to connect the valve member 116 with the thrust plate 83. The space 119 is vented to the atmosphere through a small vent hole 124, so that when the valve member 116 closes upon the seat 117, the pressure within the inner Sylphon falls to atmospheric. Space 121, between orifices 117, 118, is connected by pipe 125 with the space 77 below the piston 33. The outer Sylphon 112 is protected by suitable means such as the outer shell 126.

An adjustable coupling is provided between the rod 36 and the valve stem 25. Thus the lower end portion 127 of the rod 36 is split as illustrated, and it is bored and threaded internally to receive the upper threaded end portion 128 of the valve stem 25. A two part clamp 129 embraces the lower portion 127 and is secured by a bolt 131, thus normally serving to contract the lower end portion 127 into tight gripping engagement with the upper threaded end portion of the stem 25. Upon loosening bolt 131 it is possible to turn the stem 25 relative to rod 36 in order to effect longitudinal adjustment between the same. The clamp 129 is also provided with a portion 132 which forms a position indicator in conjunction with the stationary scale 133. A flexible protective sleeve 134 is attached at its ends to the rod 36 and the sleeve 84, and serves to protect the sliding engagement to prevent entrance of foreign material.

Operation of the apparatus described above is as follows: Pipe 106 is connected to a suitable source of air under pressure, and the regulator 102 is adjusted to provide a loading pressure of the value desired, as for example a pressure of the order of 5 p. s. i. Pipe 107 is connected to the controlling instrument or other source of controlling pressure, which is to determine the position of the valve. The valve positioner is of the supply and waste type, and serves to supply air under pressure to the space 77 to position the piston 33 in accordance with the value of the controlling pressure. Assuming that no change is taking place in the controlling pressure, the valve positioner is in a position of equilibrium in which the valve member 116 is stationary and so positioned that air from the source of supply flows through the orifices of both valve seats 118 and 117, whereby the pressure maintained in space 121 and transmitted to the space 77 holds the piston in a desired balanced position. If a higher instrument or controlling pressure is applied through pipe 107, then the plate 83 is moved a slight amount against the pressure of spring 84, and this serves to cause the valve member 116 to close down somewhat upon the seat 117, while opening with respect to seat 118. As a result the pressure in space 121 is increased, and this pressure being transmitted to space 77, moves the piston 33 so that the piston assumes a new position of equilibrium. Conversely when a lower controlling pressure is applied to pipe 107, the thrust member 83 moves upwardly a slight amount under the urge of spring 84, and as a result the valve 116 moves toward closed position with respect to seat 118, and opens with respect to seat 117. This has the net effect of reducing the pressure in space 121, and correspondingly reducing the pressure in space 77 to permit the piston 33 to move downwardly to a new corresponding position.

It will be evident from the foregoing that my apparatus provides a relatively simple assembly of parts, and one which permits a desirable mounting of the valve positioner directly upon the loading dome, and a relatively direct connection between this valve positioner and the valve stem. The valve positioner is isolated from the loading pressure, and therefore the instrument pressure may vary over a range of say from 2 to 100 p. s. i., with use of a loading pressure within this range of instrument pressure, as for example a pressure of 5 p. s. i. In addition to the foregoing features the assembly of parts permits ready adjustment of the tension of spring 84, simply by removing the mounting plate 81 together with the valve positioner, to enable access to the thrust disc 86. Likewise the manner in which the dome is assembled and sealed with respect to the plate 37 permits ready manufacture, and also permits ready field repair and replacement of parts. The particular manner in which the rod 36 is coupled to the stem 25 facilitates making adjustments between the piston and the valve member such as may be necessary from time to time to insure proper positioning and closure of the valve member.

I claim:

1. In a control apparatus; a fluid pressure operated member adapted to be connected to a movable member to move the same, a dome and wall means forming closed spaces on opposite sides of the fluid pressure operated member, means serving to maintain air in one of said spaces at substantially constant superatmospheric pressure, a valve positioner device having a movable valve member of the supply and waste type and having a fluid pressure operated element with a closed chamber on one side of the same, means serving to connect said closed chamber to a source of controlling pressure, means for connecting said device to a source of air under pressure and also to the other one of said spaces, said device being mounted upon top of the dome and on that side of the fluid pressure operated member where said one space is located, and means including a spring serving to operatively connect said fluid pressure operated member to said element of the valve positioner device, said spring extending directly between said fluid pressure operated member and said device.

2. In a control apparatus; a fluid pressure operated member adapted to be connected to a movable member to move the same, a dome and wall means forming closed spaces on opposite sides of the fluid pressure operated member, means serving to maintain air in one of said spaces at substantially constant superatmospheric pressure, a valve positioner device having a movable valve member of the supply and waste type and having a fluid pressure operated element with a closed chamber on one side of the same, means serving to connect said chamber to a source of controlling gas pressure, means for pneumatically connecting said device to a source of air under pressure and to the other one of said spaces, said device being mounted on top of the dome and on that side of the fluid pressure operated member where said one space is located, means including a spring serving to operatively connect the said element of the said valve positioner device to said fluid pressure operated member, and means serving to isolate the pressure in said one space from said valve positioner device.

3. In a control apparatus; a fluid pressure operated member adapted to be connected to a movable member and serving to move the same, a dome and wall means forming closed spaces on opposite sides of the fluid pressure operated member, means serving to maintain air in one of said spaces at substantially constant superatmospheric pressure, a valve positioner device having a movable valve member of the supply and waste type and having a fluid pressure operated element with a closed chamber on one side of the same, means serving to connect said chamber to a source of controlling pressure, means serving to connect said device to a source of air pressure and also to the space on the other side of said fluid pressure operated member, whereby said valve positioner device serves to supply air at varying pressures to operate said fluid pressure operated member responsive to the value of a controlling pressure, said valve positioner device being mounted on top of the dome and on that side of the fluid pressure operated member where said one space is located, means including a spring serving to operatively connect said fluid pressure operated member to said element of the valve positioner device, and means serving to isolate the pressure in said one space from said valve positioner device comprising interfitting annular parts mounted respectively on the fluid pressure operated member and on the top of the dome and serving to embrace said valve positioner device and said spring, the space within said annular parts being vented to the atmosphere.

4. In a control apparatus; a fluid pressure operated piston adapted to be connected to a movable member to move the same, a dome in which the piston is fitted and wall means forming closed spaces on opposite sides of the piston, means serving to maintain air in one of said spaces at constant superatmospheric pressure to form a loading force on the piston, a valve positioner device mounted on top of the dome in substantial alignment with said piston and on that side of the piston where said one space is located, said valve positioner device having a movable valve member of the supply and waste type and having a fluid pressure operated element with a closed chamber on one side of the same, means serving to connect said chamber to a source of controlling gas pressure, means serving to connect said valve positioner device to a source of air under pressure and also to the space on the other side of the piston, whereby the valve positioner device serves to control application of air under pressure to said piston to move the piston against said loading force, means including a compression spring extending between the valve positioner device and said piston, one end of said spring acting against said element and the other end of said spring being adjustably connected to said piston, and means serving to isolate said one space from the valve positioner device, said means comprising interfitting annular parts mounted respectively on the piston and on the top of the dome and serving to embrace said valve positioner device and said spring, said interfitting parts being sealed with respect to each other and having the space within the same vented to the atmosphere.

DOUGLAS H. ANNIN.

REFERENCES CITED

The following references are of record in the file of this patent:

UNITED STATES PATENTS

| Number | Name | Date |
| --- | --- | --- |
| 1,182,445 | Bailie | May 9, 1916 |
| 1,484,516 | MacFarland | Feb. 19, 1924 |
| 2,035,966 | Hubbard | Mar. 31, 1936 |
| 2,061,118 | Vogt | Nov. 17, 1936 |
| 2,197,125 | Cox | Apr. 16, 1940 |
| 2,248,322 | Annin | July 8, 1941 |
| 2,278,402 | Harris | Mar. 31, 1942 |
| 2,382,941 | Moore | Aug. 14, 1945 |
| 2,390,445 | Mercier | Dec. 4, 1945 |
| 2,411,748 | Kelley | Nov. 26, 1946 |
| 2,479,454 | Annin | Aug. 16, 1949 |